「12」 United States Patent
Shimizu et al.

(10) Patent No.: US 10,444,784 B2
(45) Date of Patent: Oct. 15, 2019

(54) ELECTRIC LEVER DEVICE (71) Applicant: KAWASAKI JUKOGYO KABUSHIKI KAISHA, Kobe-shi, Hyogo (JP)

(72) Inventors: Hiroaki Shimizu, Akashi (JP); Yasuaki Kida, Kobe (JP); Yousuke Hirata, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 16/308,708

(22) PCT Filed: Jun. 8, 2017

(86) PCT No.: PCT/JP2017/021387
§ 371 (c)(1),
(2) Date: Dec. 10, 2018

(87) PCT Pub. No.: WO2017/217322
PCT Pub. Date: Dec. 21, 2017

(65) Prior Publication Data
US 2019/0146544 A1 May 16, 2019

(30) Foreign Application Priority Data

Jun. 15, 2016 (JP) .................. 2016-118479

(51) Int. Cl.
G05G 1/04 (2006.01)
G05G 5/06 (2006.01)
(Continued)

(52) U.S. Cl.
CPC ............. *G05G 1/015* (2013.01); *F16H 25/18* (2013.01); *G05G 1/04* (2013.01); *G05G 5/06* (2013.01); *G05G 2505/00* (2013.01)

(58) Field of Classification Search
CPC ............ G05G 1/015; G05G 1/04; G05G 5/06; G05G 2505/00; F16H 25/18
See application file for complete search history.

(56) References Cited

U.S. PATENT DOCUMENTS 3,410,971 A * 11/1968 Sandor ................. H01H 23/168
200/302.3
4,148,002 A * 4/1979 Krasser ................. H01H 71/52
200/339
(Continued)

FOREIGN PATENT DOCUMENTS

JP S48-102272 A 12/1973
JP H07-013890 U 3/1995
(Continued)

Primary Examiner — Adam D Rogers
(74) Attorney, Agent, or Firm — Oliff PLC (57) ABSTRACT An electric lever device includes: a casing including a base portion attached to a machine main body; a cam supported by a support shaft at the casing and configured to swing in a plane intersecting with a center axis of the support shaft; and an operating lever fixed to the cam and configured to be tilted integrally with the cam in the same plane, wherein: a tilt detecting switch configured to detect tilt of the operating lever is attached to the casing so as to be located higher than the base portion; and the cam includes a tilt detection engaging portion configured to move an acting portion of the tilt detecting switch when the operating lever is tilted from a neutral position.

11 Claims, 7 Drawing Sheets (51) Int. Cl.
*G05G 1/015* (2008.04)
*F16H 25/18* (2006.01)

(56) References Cited

U.S. PATENT DOCUMENTS

| | | | | |
|---|---|---|---|---|
| 4,524,636 A * | 6/1985 | Nishikawa | ............... | G05G 5/06 |
| | | | | 74/527 |
| 6,566,619 B2 * | 5/2003 | Gillman | ................ | H01H 23/30 |
| | | | | 200/339 |
| 7,380,478 B2 * | 6/2008 | Harrington | ............. | G05G 1/04 |
| | | | | 74/483 R |
| 8,030,587 B2 * | 10/2011 | Chanteloup | ............ | H01H 23/30 |
| | | | | 200/557 |
| 9,027,597 B2 * | 5/2015 | Kubo | ................... | E02F 9/2004 |
| | | | | 137/625.25 |
| 9,529,378 B2 * | 12/2016 | Jeon | ........................ | G05G 5/03 |

FOREIGN PATENT DOCUMENTS

| | | | | |
|---|---|---|---|---|
| JP | 2009-268682 A | 11/2009 | | |
| WO | WO-2010142516 A2 * | 12/2010 | ............ | B61C 17/12 |

* cited by examiner

ELECTRIC LEVER DEVICE

TECHNICAL FIELD

The present invention relates to an electric lever device for use in, for example, construction machines, such as crane vehicles.

BACKGROUND ART

In some conventional cases, an electric lever device for outputting an operation command is adopted in construction machines and industrial machines, such as crane vehicles and excavators. The electric lever device outputs the operation command to an operating portion by an output value based on a tilt angle of an operating lever. In addition to a tilt angle signal of the operating lever, the electric lever device is provided with a tilt detecting switch configured to detect that the operating lever is located at a neutral position. The tilt detecting switch mechanically detects that the operating lever is not being tilted, and this prevents malfunctions, for example.

As conventional art of this type of electric lever device, there is an electric lever device configured such that: two cams are attached to an operating lever of a crane; and each cam turns on a limit switch at an operation point with respect to reverse rotation of the operating lever (see PTL 1, for example). According to this conventional art, the two cams are arranged under a rotation fulcrum of the operating lever, and the limit switches (tilt detecting switches) are arranged under the respective cams.

CITATION LIST

Patent Literature

PTL 1: Japanese Laid-Open Utility Model Application Publication No. 7-13890

SUMMARY OF INVENTION

Technical Problem

According to the above conventional art, the two tilt detecting switches are located under the respective cams provided lower than the rotation fulcrum of the operating lever. Therefore, adjusting work of attaching the tilt detecting switch while realizing an appropriate positional relation between the cam and the tilt detecting switch is difficult. In addition, the tilt detecting switches are located at a lower end portion of the electric lever device. Therefore, there is a high possibility that after the tilt detecting switches are attached to the electric lever device and before the electric lever device is attached to a machine main body, the tilt detecting switches contact other structures. If the tilt detecting switches contact other structures before the electric lever device is attached to the machine main body, position adjusting work of the tilt detecting switches needs to be performed again. Thus, adjustments during manufacture, handling after the adjustments, and the like require time and labor. In addition, since the tilt detecting switches are located at the lower end portion of the electric lever device, the electric lever device may increase in size in a lower direction.

An object of the present invention is to provide an electric lever device in which attachment and adjustment of a tilt detecting switch can be easily performed and which can be reduced in size.

Solution to Problem

To achieve the above object, the present invention includes: a casing including a base portion attached to a machine main body; a cam supported by a support shaft at the casing and configured to swing in a plane intersecting with a center axis of the support shaft; and an operating lever fixed to the cam and configured to be tilted integrally with the cam in the same plane, wherein: a tilt detecting switch configured to detect tilt of the operating lever is attached to the casing so as to be located higher than the base portion; and the cam includes a tilt detection engaging portion configured to move an acting portion of the tilt detecting switch when the operating lever is tilted from a neutral position. In the present description and claims, examples of the term "machine main body" include a machine main body of a steering device of a machine, such as a crane vehicle.

According to this configuration, work of attaching the tilt detecting switch configured to detect the tilt of the operating lever can be performed at a position higher than the base portion of the casing. Therefore, the tilt detecting switch can be easily attached. In addition, the adjustment of the tilt detecting switch can be easily performed at a position higher than the base portion of the casing. Further, since the tilt detecting switch is attached to the casing at a position higher than the base portion, the electric lever device can be prevented from increasing in size in a lower direction. When the operating lever is tilted from the neutral position, the tilt detection engaging portion of the cam that is supported by the casing and tilted integrally with the operating lever directly moves the acting portion of the tilt detecting switch. Thus, the tilt of the operating lever can be detected.

Further, the present invention may be configured such that: the cam includes an outer peripheral surface and a side surface; the tilt detection engaging portion is formed at the side surface; the casing includes a bracket at a position away from the cam in an axial direction of the support shaft; and the tilt detecting switch is attached to the bracket.

According to this configuration, the tilt detecting switch can be attached to the bracket such that the acting portion of the tilt detecting switch can be moved by the tilt detection engaging portion formed at the side surface of the cam. With this, the tilt detecting switch can be easily attached at the side surface of the cam. Further, the adjustment of the tilt detecting switch can be easily performed at the side surface of the cam.

Further, the present invention may be configured such that: the cam includes an outer peripheral surface and a side surface; the tilt detection engaging portion is formed at the outer peripheral surface; the casing includes a bracket at a position away from the cam in a swing direction of the cam; and the tilt detecting switch is attached to the bracket.

According to this configuration, the tilt detecting switch can be attached to the bracket such that the acting portion of the tilt detecting switch is moved by the tilt detection engaging portion formed at the outer peripheral surface of the cam. With this, the tilt detecting switch can be easily attached in a swing direction of the cam. Further, the adjustment of the tilt detecting switch can be easily performed in the swing direction of the cam. In addition, the number of parts at the side surface of the cam can be made small.

The present invention may be configured such that: the cam includes a first tilt detection engaging portion configured to detect that the operating lever is tilted in a first direction from the neutral position and a second tilt detection engaging portion configured to detect that the operating lever is tilted in a second direction from the neutral position; and the tilt detecting switch includes a first tilt detecting switch including a first acting portion that is moved by the first tilt detection engaging portion when the operating lever is tilted in the first direction from the neutral position and a second tilt detecting switch including a second acting portion that is moved by the second tilt detection engaging portion when the operating lever is tilted in the second direction from the neutral position.

According to this configuration, the tilt of the operating lever in the first direction can be detected by the first acting portion of the first tilt detecting switch, and the tilt of the operating lever in the second direction can be detected by the second acting portion of the second tilt detecting switch. With this, the direction in which the operating lever is tilted can be detected by the tilt detecting switch which has detected the tilt of the operating lever. Therefore, the tilt of the operating lever can be detected more appropriately.

The present invention may be configured such that: the cam includes the tilt detection engaging portion at one position; and the tilt detecting switch is configured such that even when the operating lever is tilted in any of the first direction and the second direction from the neutral position, the tilt detection engaging portion moves the acting portion.

According to this configuration, the tilt of the operating lever in the first direction and the second direction from the neutral position can be detected by one tilt detecting switch. Therefore, the components of the tilt detecting switch can be reduced. Thus, the electric lever device can be easily assembled, and the device cost can be reduced.

The present invention may be configured such that the cam further includes a maximum tilt engaging portion configured to move the acting portion of the tilt detecting switch when the operating lever is tilted to a maximum tilt position.

According to this configuration, the tilt of the operating lever to the maximum tilt position can be detected by the movement of the acting portion of the tilt detecting switch moved by the maximum tilt engaging portion of the cam. In addition, the attachment and adjustment of the tilt detecting switch configured to detect the maximum tilt position can be performed at a position higher than the base portion of the casing.

Advantageous Effects of Invention

According to the present invention, since the tilt detecting switch configured to detect the tilt of the operating lever is attached to the casing at a position higher than the base portion, the attachment and adjustment of the tilt detecting switch can be easily performed. Further, since the tilt detecting switch is attached to the casing at a position higher than the base portion, the electric lever device can be prevented from increasing in size in the lower direction.

BRIEF DESCRIPTION OF DRAWINGS

FIGS. 3A and 3B are diagrams each showing an operating part of a tilt detecting switch of the electric lever device shown in FIG. 2.

FIGS. 7A to 7C are diagrams each showing the operating part of the tilt detecting switch of the electric lever device shown in FIG. 6.

DESCRIPTION OF EMBODIMENTS

Hereinafter, embodiments of the present invention will be explained based on the drawings. Each of the embodiments below explains an electric lever device 1 including an operating lever 30 which is tilted in left and right directions from a neutral position. The concept of upper, lower, left, and right directions in the present description and claims corresponds to the concept of upper, lower, left, and right directions when viewing the electric lever device 1 shown in FIG. 1.

Configuration of Electric Lever Device

Figure 1:
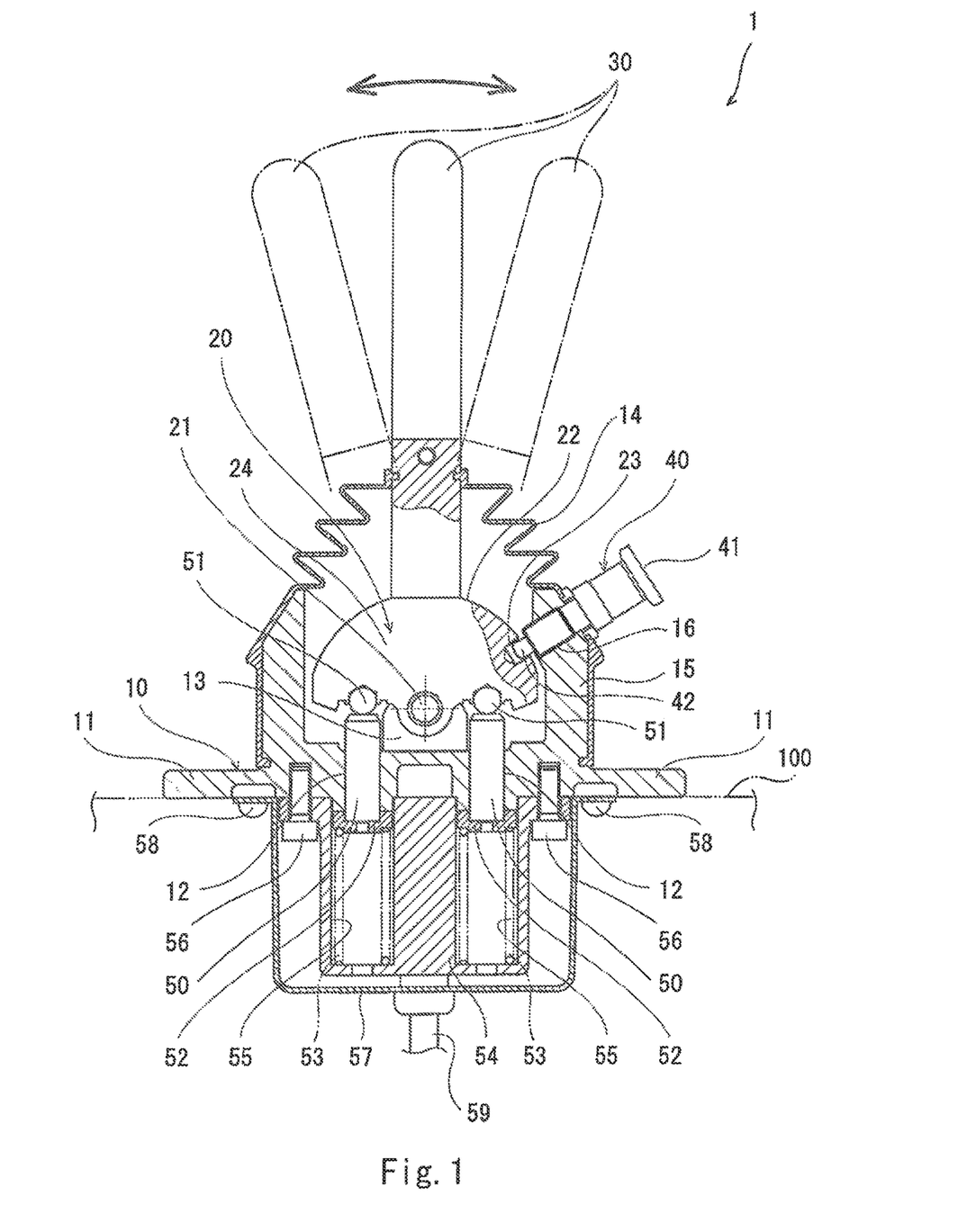
FIG. 1 is a sectional back view showing an assembled state of an electric lever device according to Embodiment 1 of the present invention.

FIG. 1 is a sectional back view showing an assembled state of the electric lever device according to Embodiment 1 of the present invention. As shown in FIG. 1, the electric lever device 1 of the present embodiment includes a casing 10 including a base portion 11 attached to a machine main body 100 (such as a steering machine or travelling device of a crane vehicle). In the casing 10, a cam 20 is supported by a support shaft 21. The support shaft 21 is supported by a support bracket 13 provided at the casing 10. As described below, a potentiometer 25 (see FIG. 2) configured to detect a tilt angle of the cam 20 is provided at the support shaft 21. As shown in FIG. 1, the cam 20 is formed in a substantially semi-circular shape in a front view, and the support shaft 21 extends through a substantially center of the substantially semi-circular shape. The cam 20 can swing about the support shaft 21 in the left and right directions in a plane intersecting with a center axis of the support shaft 21 (i.e., a plane perpendicular to a paper surface perpendicular direction). The cam 20 includes an outer peripheral surface 22 and a side surface 24. Specifically, the cam 20 is formed in a substantially semi-cylindrical shape having a substantially semi-circular shape in a front view. Further, the side surface 24 is substantially perpendicular to the support shaft 21 and has a substantially semi-circular shape, and the outer peripheral surface 22 extends along a circular-arc portion of the side surface 24 and faces upward. The operating lever 30 is fixed to an upper portion of the cam 20. In the present embodiment, the operating lever 30 is provided at a middle of the outer peripheral surface 22 extending in a swing direction of the cam 20. When the operating lever 30 is located at the neutral position, the cam 20 is bilaterally symmetrical in a front view, and the operating lever 30 extends from the outer peripheral surface 22 in a vertically upper direction. By tilting the operating lever 30, the cam 20 integrally swings in the same plane.

A stopper bracket 15 to which a stopper 40 is attached is provided at an upper portion of the casing 10. The stopper 40 mechanically fixes the position of the cam 20. The stopper 40 is used when, for example, the electric lever device 1 is not used or is being carried. The stopper bracket 15 includes an opening hole 16 at a predetermined position. The opening hole 16 includes a center axis extending toward the support shaft 21 of the cam 20. The stopper 40 is fixed to the opening hole 16. By screwing a holding portion 41 of the stopper 40, a convex portion 42 at a tip end of the stopper 40 is inserted into a hole portion 23 provided at the outer peripheral surface 22 of the cam 20. Thus, the cam 20 is fixed so as not to be tilted. FIG. 1 shows a fixed state of the cam 20. In this state, it is unnecessary to detect the tilt of the operating lever 30 by a below-described tilt detecting switch 60.

Push rods 50 configured to return the operating lever 30 to the neutral position are provided at the casing 10 so as to be located under the cam 20. Balls 51 are provided at a lower surface of the cam 20 so as to be equally spaced apart from the support shaft 21 in the left-right direction. Upper end surfaces of the push rods 50 contact respective lower ends of the balls 51. The push rods 50 are slidable in the upper-lower direction along respective guide holes 12 formed at the casing 10. Rod receivers 52 are provided at respective lower ends of the push rods 50, and springs 53 are provided under the respective rod receivers 52. The springs 53 are arranged at respective tubular space portions 55 formed in a spring casing 54 fixed to a lower surface of the casing 10.

Therefore, the cam 20 is biased upward by the springs 53 from below at positions equally spaced part from the support shaft 21 in the left-right direction. The cam 20 is returned to a neutral state with respect to the support shaft 21 by the force of the springs 53. With this, the operating lever 30 fixed to the cam 20 is returned to the neutral position.

The components for returning the operating lever 30 to the neutral position are assembled as below. The springs 53 are arranged at the respective tubular space portions 55 formed in the spring casing 54 fixed to the lower surface of the casing 10. The rod receivers 52 are arranged at respective upper portions of the springs 53. The push rods 50 are inserted into the respective guide holes 12, and the rod receivers 52 receive respective lower ends of the push rods 50. In this state, the spring casing 54 is fixed to the casing 10 with bolts 56. After that, a cover 57 is attached outside the spring casing 54 with screws 58. Thus, work of attaching the components to a lower portion of the casing 10 is completed. A wire 59 for the potentiometer 25, the below-described tilt detecting switch 60 (see FIG. 2), and the like passes through the cover 57. According to this configuration, the components provided at the lower portion of the casing 10 do not require adjustment and the like after the spring casing 54 and the cover 57 are attached. In FIG. 1, a bellows cover 14 is attached above the cam 20 so as to cover a lower portion the operating lever 30 and the cam 20.

The tilt detecting switch 60 (see FIGS. 2 to 7) is attached above the base portion of the casing 10. The tilt detecting switch 60 detects the tilt of the cam 20 that tilts integrally with the operating lever 30. Hereinafter, electric lever devices 1 to 4 according to Embodiments will be explained. Only the components provided above the casing 10 in the following explanations are shown.

Embodiment 1

Figure 2:
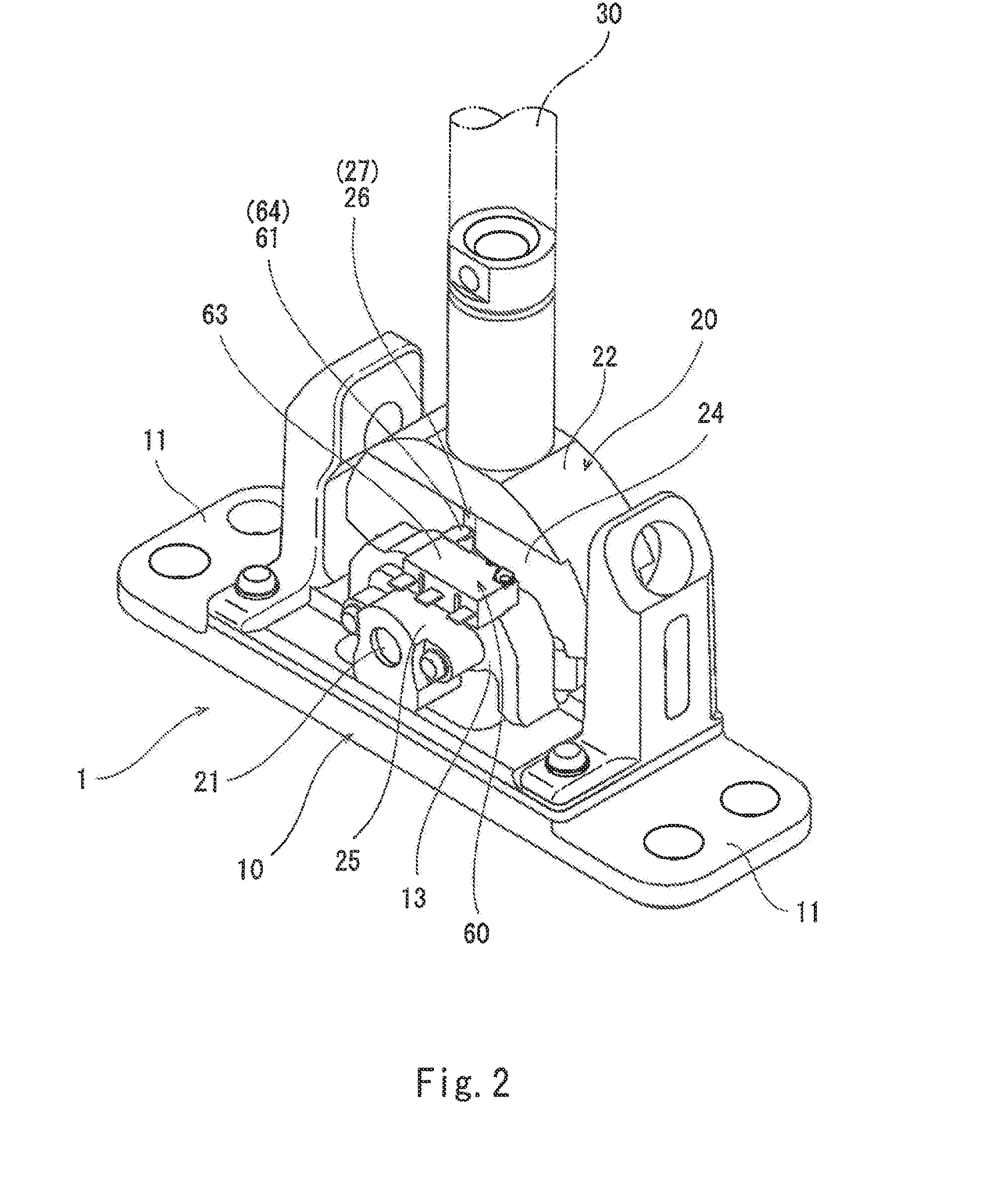
FIG. 2 is a front perspective view of the electric lever device shown in FIG. 1.

FIG. 2 is a front perspective view showing the electric lever device 1 according to Embodiment 1. It should be noted that the same reference sings are used for the same components as in FIG. 1, and a repetition of the same explanation is avoided. As shown in FIG. 2, the support bracket 13 supporting the support shaft 21 of the cam 20 is provided at the casing 10. The potentiometer 25 configured to detect the tilt angle of the cam 20 is provided at one side of the support bracket 13. The potentiometer 25 detects the tilt angle of the operating lever 30 integrated with the cam 20 and outputs the output value based on the tilt angle. The output value is converted by a controller (not shown and constituted by a CPU, a memory, and the like) into an operation command with respect to the operating portion.

In the electric lever device 1 of the present embodiment, one tilt detecting switch 60 is attached to an upper portion of the support bracket 13. The support bracket 13 is provided away from the cam 20 in an axial direction of the support shaft 21. A tilt detection engaging portion 26 that is a concave groove is provided at one position of the side surface 24 of the cam 20, the side surface 24 being located at a side where the tilt detecting switch 60 is provided. The tilt detection engaging portion 26 includes a concave portion 27 that is concave from the side surface 24 and extends in a radial direction of the cam 20. Specifically, the concave portion 27 is a flat surface that is parallel to the side surface 24 and located at a middle side of the cam 20 in the front-rear direction (i.e., in a direction in which the support shaft 21 extends) from the side surface 24. A pair of inclined portions 28 are formed at both respective sides of the concave portion 27 in the left-right direction. Each of the inclined portions 28 is a surface that connects the side surface 24 and the concave portion 27 and is inclined relative to the side surface 24 and the concave portion 27. The tilt detection engaging portion 26 of the present embodiment is formed on a line extending from the support shaft 21 in an axial direction of the operating lever 30.

The tilt detecting switch 60 includes an acting portion 61 and a switch main body portion 63. The acting portion 61 is provided at a tip end of an arm portion 62 (see FIGS. 3A and 3B). The arm portion 62 extends from the switch main body portion 63 toward the side surface 24 in an oblique direction with respect to the side surface 24. The tilt detecting switch 60 is attached such that when the operating lever 30 is located at the neutral position, the acting portion 61 is located at (contacts) the concave portion 27 (see FIG. 3A) of the tilt detection engaging portion 26. With this, as described below, when the cam 20 is tilted in any of the left and right directions, the acting portion 61 moves from the concave portion 27 of the tilt detection engaging portion 26 onto the side surface 24 of the cam 20 to be pushed toward the switch main body portion 63. The acting portion 61 includes a roller 64 that contacts the concave portion 27. Therefore, as shown in shown in FIG. 3B, when the operating lever 30 is tilted from the neutral position, the roller 64 smoothly moves from the concave portion 27 of the tilt detection engaging portion 26 through the inclined portion 28 onto the side surface 24 of the cam 20.

In the present embodiment, the tilt detection engaging portion 26 that is the concave groove is provided at the center of the cam 20 in the left-right direction. However, the position of the tilt detection engaging portion 26 is not limited to the center of the cam 20 in the left-right direction. In addition, the tilt detection engaging portion 26 may be a V-shaped groove or the like instead of the concave groove.

Explanations of Operations in Embodiment 1

Figure 3A:
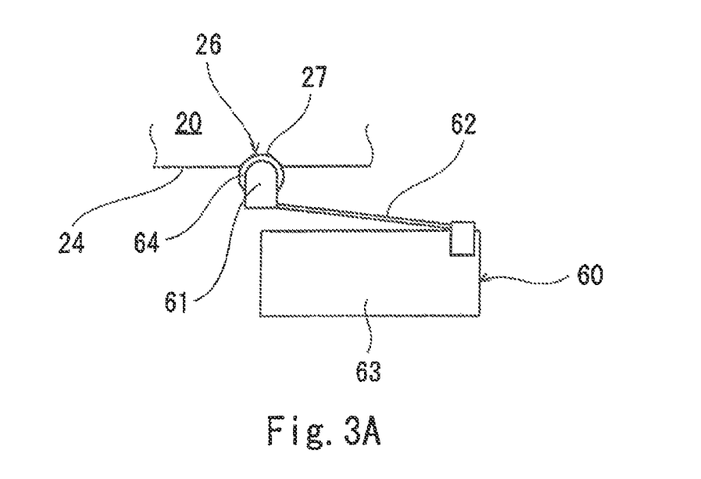
FIG. 3A is a plan view when the operating lever is neutral.
Figure 3B:
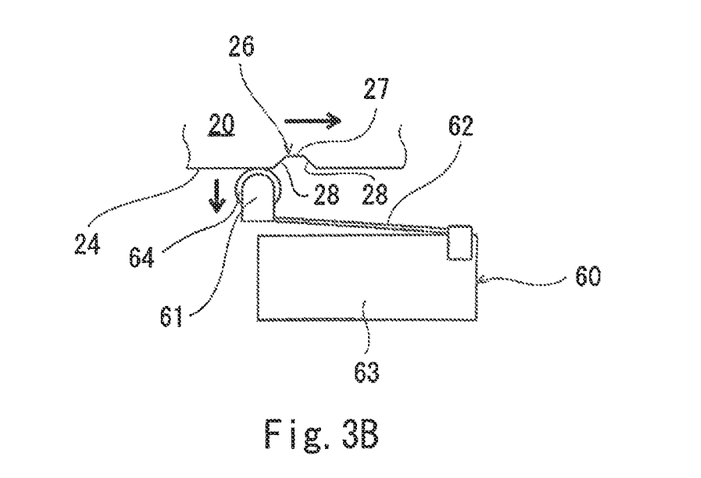
FIG. 3B is a plan view when the operating lever is tilted.

FIGS. 3A and 3B are diagrams each showing an operating part of the tilt detecting switch 60 of the electric lever device 1. FIG. 3A is a plan view when the operating lever 30 is neutral. FIG. 3B is a plan view when the operating lever 30 is tilted. As shown in FIG. 3A, when the operating lever 30 is located at the neutral position, the acting portion 61 of the tilt detecting switch 60 is located at the concave portion 27 of the tilt detection engaging portion 26. Therefore, the tilt of the operating lever 30 is not detected by the tilt detecting switch 60, and it is determined that the operating lever 30 is located at the neutral position.

As shown in FIG. 3B, for example, when the operating lever 30 is tilted in the right direction, and the cam 20 is integrally tilted, the acting portion 61 of the tilt detecting switch 60 moves from the concave portion 27 through the inclined portion 28 onto the side surface 24 of the cam 20 to be pushed toward the switch main body portion 63. With this, the tilt of the operating lever 30 is detected. Similarly, when the operating lever 30 is tilted in the left direction, the acting portion 61 of the tilt detecting switch 60 moves from the concave portion 27 through the inclined portion 28 onto the side surface 24 of the cam 20 to be pushed toward the switch main body portion 63. With this, the tilt of the operating lever 30 is detected.

It should be noted that the determination regarding whether or not the operating lever 30 is tilted can be set based on a swing angle of the cam 20 when the acting portion 61 of the tilt detecting switch 60 moves from the concave portion 27 of the tilt detection engaging portion 26 to the side surface 24 of the cam 20 to be pushed toward the switch main body portion 63. Specifically, the swing angle of the cam 20 when it is determined that the operating lever 30 is tilted, i.e., when the acting portion 61 moves from the concave portion 27 to the side surface 24 of the cam 20 can be set in accordance with the size of the concave portion 27. When the concave portion 27 is large, the tilt of the operating lever 30 is not detected unless the operating lever 30 is largely tilted. When the concave portion 27 is small, the tilt of the operating lever 30 can be detected even if the tilt of the operating lever 30 is small.

As above, according to the electric lever device 1 of Embodiment 1, the acting portion 61 of the tilt detecting switch 60 is brought into contact with one tilt detection engaging portion 26. With this, even when the cam 20 is tilted in any of the left and right directions, the tilt of the operating lever 30 can be detected by the movement of the acting portion 61 toward the switch main body portion 63. In the present embodiment, the tilt of the operating lever 30 in the left and right directions can be detected by one tilt detecting switch 60. Therefore, the configuration of the tilt detecting switch 60 can be minimized, and the device cost can be reduced.

Embodiment 2

Figure 4:
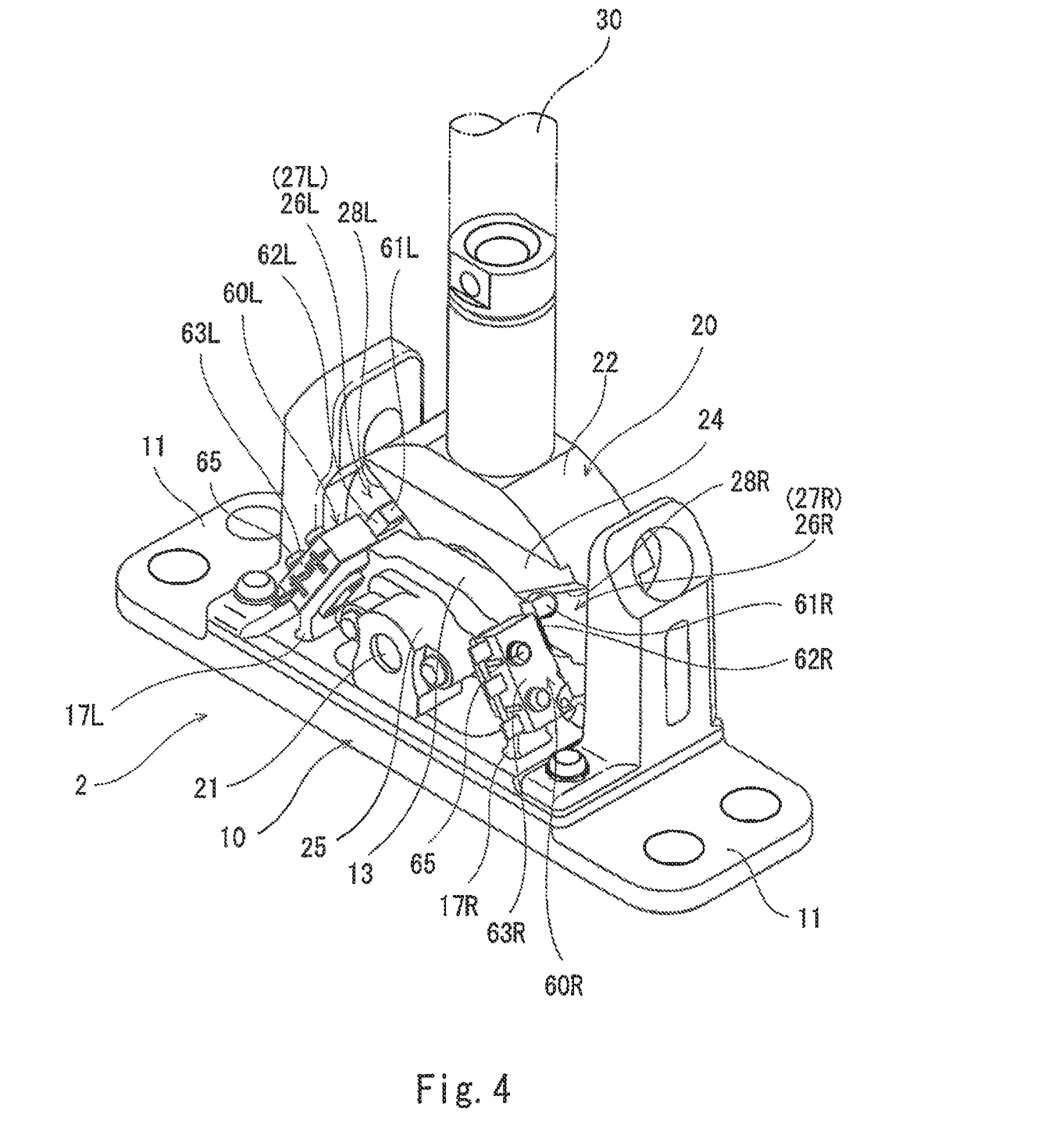
FIG. 4 is a front perspective view showing the electric lever device according to Embodiment 2 of the present invention.

FIG. 4 is a front perspective view showing the electric lever device 2 according to Embodiment 2. In Embodiment 2, a plurality of (two in the present embodiment) tilt detecting switches 60R and 60L are provided. In the present embodiment, the same reference signs are used for the same components as in Embodiment 1, and a repetition of the same explanation is avoided.

In the present embodiment, a first tilt detection engaging portion 26R and a second tilt detection engaging portion 26L are provided at the side surface 24 of the cam 20. The first tilt detection engaging portion 26R detects that the operating lever 30 is tilted in the right direction from the neutral position. The second tilt detection engaging portion 26L detects that the operating lever 30 is tilted in the left direction from the neutral position. The tilt detection engaging portions 26R and 26L include respective concave portions 27R and 27L that are concave from the side surface 24 of the cam 20. The concave portion 27R is formed such that an inclined portion 28R (see FIG. 3) between the concave portion 27R and the side surface 24 of the cam 20 extends from the center axis of the support shaft 21 in the radial direction of the cam 20, and the concave portion 27L is formed such that an inclined portion 28L (see FIG. 3) between the concave portion 27L and the side surface 24 of the cam 20 extends from the center axis of the support shaft 21 in the radial direction of the cam 20. Specifically, each of the concave portions 27R and 27L is a flat surface that is parallel to the side surface 24 and located at a middle side of the cam 20 in the front-rear direction (i.e., in a direction in which the support shaft 21 extends) from the side surface 24. The inclined portion 28R is formed at a left side of the concave portion 27R. The inclined portion 28R connects the concave portion 27R and the side surface 24 and extends from the center axis of the support shaft 21 in the radial direction of the cam 20. Further, the inclined portion 28L is formed at a right side of the concave portion 27L. The inclined portion 28L connects the concave portion 27L and the side surface 24 and extends from the center axis of the support shaft 21 in the radial direction of the cam 20. It should be noted that in the present embodiment, the side surface 24 of the cam 20 as a portion that pushes a below-described first acting portion 61R or a below-described second acting portion 61L is not provided at any of the right side of the concave portion 27R and the left side of the concave portion 27L.

Switch brackets 17R and 17L are provided at an upper surface of the casing 10 so as to be spaced apart from the cam 20 in the axial direction of the support shaft 21. The first switch bracket 17R is provided at a position at which the first tilt detecting switch 60R is attached. The second switch bracket 17L is provided at a position at which the second tilt detecting switch 60L is provided. The switch brackets 17R and 17L are provided so as to be opposed to the support shaft 21 in the left-right direction. The first tilt detecting switch 60R is attached to the first switch bracket 17R such that a first arm portion 62R extends in a direction perpendicular to a direction in which the inclined portion 28R extends. The second tilt detecting switch 60L is attached to the second switch bracket 17L such that a second arm portion 62L extends in a direction perpendicular to a direction in which the inclined portion 28L extends.

The first tilt detecting switch 60R is attached to the first switch bracket 17R with screws 65 such that the first acting portion 61R is located at the first concave portion 27R of the first tilt detection engaging portion 26R. The second tilt detecting switch 60L is attached to the second switch bracket 17L with the screws 65 such that the second acting portion 61L is located at the second concave portion 27L of the second tilt detection engaging portion 26L. Each of a positional relation between the first acting portion 61R of the first tilt detecting switch 60R and the first concave portion 27R and a positional relation between the second acting portion 61L of the second tilt detecting switch 60L and the second concave portion 27L is the same as a positional relation shown in FIGS. 3A and 3B between the acting portion 61 of the tilt detecting switch 60 and the concave portion 27.

According to the electric lever device 2 of the present embodiment, when the operating lever 30 is tilted in the right direction (first direction) from the neutral position, the first acting portion 61R of the first tilt detecting switch 60R moves from the first concave portion 27R of the first tilt detection engaging portion 26R onto the side surface 24 of the cam 20. With this, the first acting portion 61R of the first tilt detecting switch 60R is pushed toward a first switch main body portion 63R, and the tilt of the tilt of the operating lever 30 can be detected. Further, when the operating lever 30 is tilted in the left direction (second direction) from the neutral position, the second acting portion 61L of the second tilt detecting switch 60L moves from the second concave portion 27L of the second tilt detection engaging portion 26L onto the side surface 24 of the cam 20. With this, the second acting portion 61L of the second tilt detecting switch 60L is pushed toward the second switch main body portion 63L, and the tilt of the operating lever 30 can be detected.

According to the present embodiment, when the operating lever 30 is tilted in any of the above cases, one of the acting portion 61R of the tilt detecting switch 60R and the acting portion 61L of the tilt detecting switch 60L is pushed by the side surface 24 of the cam 20 toward the switch main body portion 63R or 63L, but the other of the acting portion 61R of the tilt detecting switch 60R and the acting portion 61L of the tilt detecting switch 60L is not pushed toward the switch main body portion 63L or 63R. Therefore, according to the present embodiment, the direction in which the operating lever 30 is tilted can be detected based on whether the acting portion 61R of the tilt detecting switch 60R is pushed or the acting portion 61L of the tilt detecting switch 60L is pushed. With this, the tilt of the operating lever 30 and the direction in which the operating lever 30 is tilted can be detected. Thus, the tilt of the operating lever 30 can be more appropriately detected.

It should be noted that when a plurality of tilt detecting switches 60R and 60L are provided as in the present embodiment, one of the tilt detecting switches 60R and 60L may be used to detect whether or not the operating lever 30 is tilted as in Embodiment 1. In this case, the position of the tilt detection engaging portion 26R or 26L may be changed such that the other of the tilt detecting switches 60L and 60R detects the maximum tilt position (full stroke; same as Embodiment 4 described below) of the operating lever 30.

Embodiment 3

Figure 5:
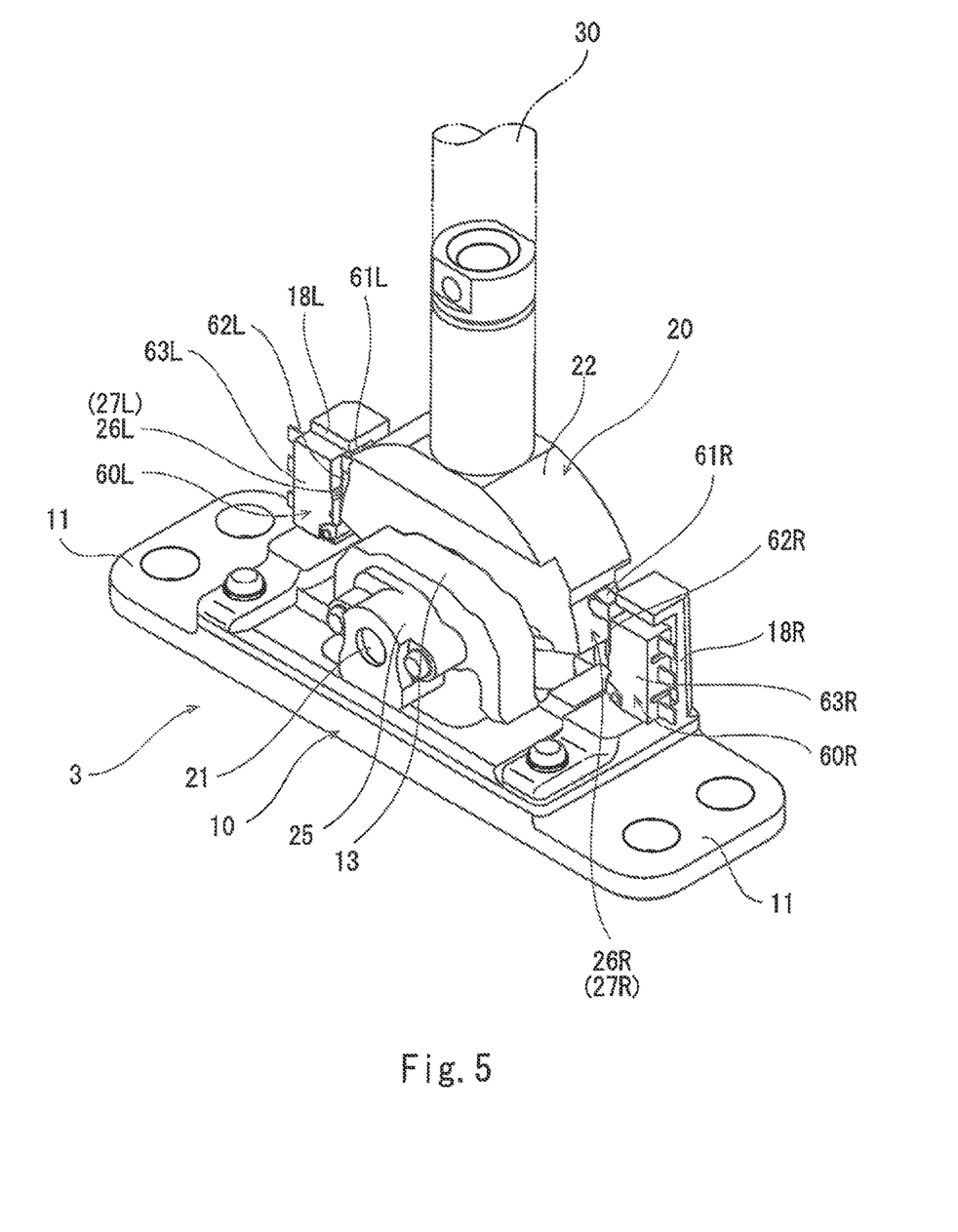
FIG. 5 is a front perspective view showing the electric lever device according to Embodiment 3 of the present invention.

FIG. 5 is a front perspective view showing the electric lever device 3 according to Embodiment 3. In the present embodiment, the tilt detection engaging portions 26R and 26L are provided at the outer peripheral surface 22 of the cam 20 instead of the side surface 24 of the cam 20 to detect the tilt of the operating lever 30. In the present embodiment, the same reference signs are used for the same components as in Embodiment 1, and a repetition of the same explanation is avoided.

In Embodiment 3, the tilt detection engaging portions 26R and 26L are provided at respective right and left positions of the outer peripheral surface 22 of the cam 20. The first tilt detection engaging portion 26R provided at the right side includes the first concave portion 27R that is concave from the outer peripheral surface 22 of the cam 20 toward the support shaft 21. The second tilt detection engaging portion 26L provided at the left side includes the second concave portion 27L that is concave from the outer peripheral surface 22 of the cam 20 toward the support shaft 21. Specifically, each of the concave portions 27R and 27L is a surface located at an inner side of the outer peripheral surface 22 in the radial direction of the cam 20 (i.e., a surface located closer to the support shaft 21 than the outer peripheral surface 22).

Switch brackets 18R and 18L are provided at the casing 10 at respective right and left positions away from the cam 20 in the swing direction. The first tilt detecting switch 60R is attached to the first switch bracket 18R provided at the right side of the cam 20. The second tilt detecting switch 60L is attached to the second switch bracket 18L provided at the left side of the cam 20. The first acting portion 61R of the first tilt detecting switch 60R is attached so as to be located at the concave portion 27R of the first tilt detection engaging portion 26R. The second acting portion 61L of the second tilt detecting switch 60L is attached to as to be located at the concave portion 27L of the second tilt detection engaging portion 26L. Each of a positional relation between the first acting portion 61R of the first tilt detecting switch 60R and the first concave portion 27R and a positional relation between the second acting portion 61L of the second tilt detecting switch 60L and the second concave portion 27L is the same as a positional relation shown in FIGS. 3A and 3B between the acting portion 61 of the tilt detecting switch 60 and the concave portion 27.

According to the electric lever device 3 of the present embodiment, when the operating lever 30 is tilted in the right direction (first direction) from the neutral position, the first acting portion 61R of the first tilt detecting switch 60R moves from the first concave portion 27R of the first tilt detection engaging portion 26R onto the outer peripheral surface 22 of the cam 20. With this, the first acting portion 61R of the first tilt detecting switch 60R is pushed toward the first switch main body portion 63R, and the tilt of the operating lever 30 can be detected. Further, when the operating lever 30 is tilted in the left direction (second direction) from the neutral position, the second acting portion 61L of the second tilt detecting switch 60L moves from the second concave portion 27L of the second tilt detection engaging portion 26L onto the outer peripheral surface 22 of the cam 20. With this, the second acting portion 61L of the second tilt detecting switch 60L is pushed toward the second switch main body portion 63L, and the tilt of the operating lever 30 can be detected.

Further, in the present embodiment, since the tilt detecting switches 60R and 60L are provided at the respective right and left positions of the cam 20, the direction in which the operating lever 30 is tilted can be detected based on the position of the tilt detecting switch 60R or 60L which has detected the tilt of the operating lever 30.

Embodiment 4

Figure 6:
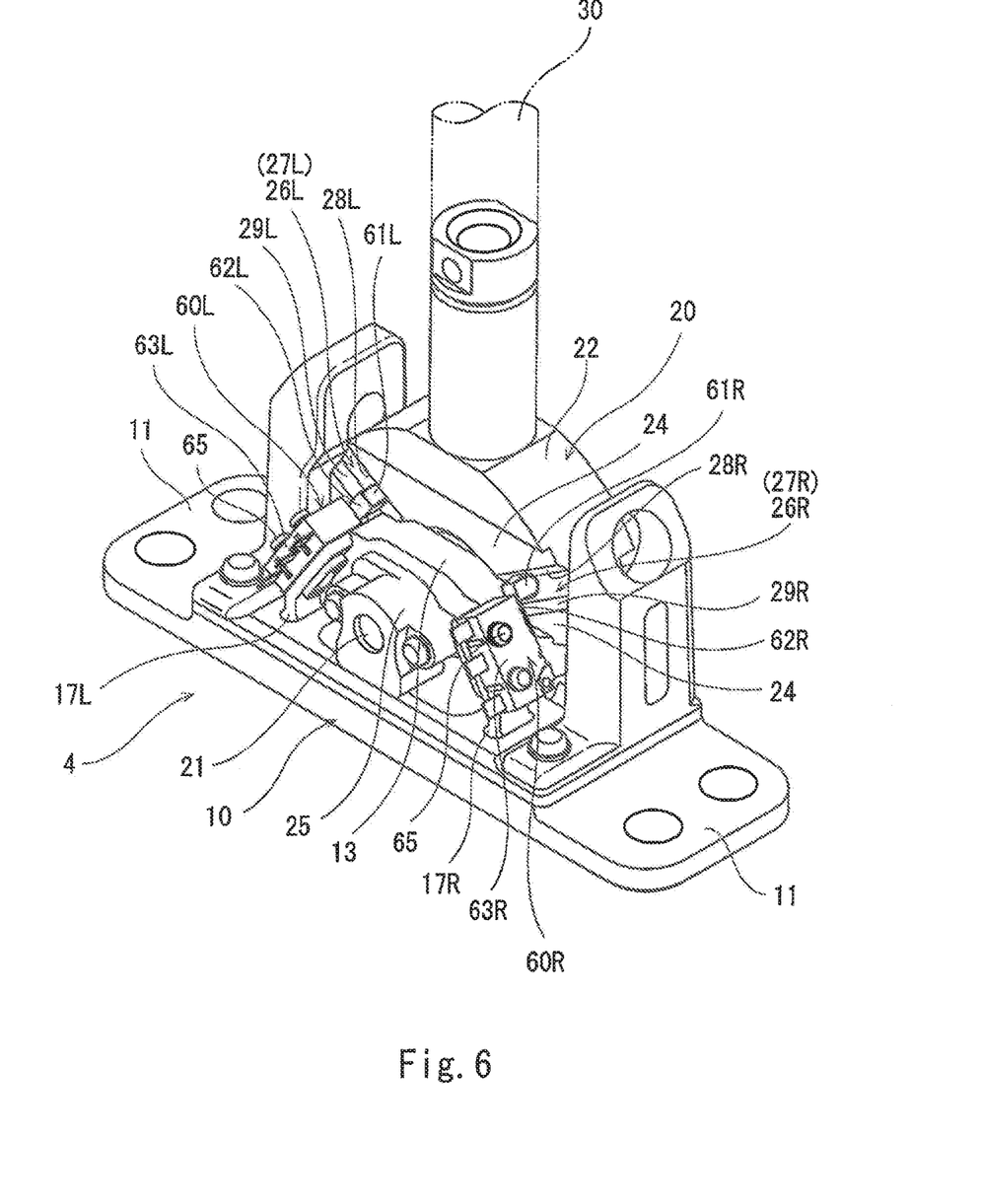
FIG. 6 is a front perspective view showing the electric lever device according to Embodiment 4 of the present invention.

FIG. 6 is a front perspective view showing the electric lever device 4 according to Embodiment 4. In the present embodiment, the maximum tilt position (full stroke) of the operating lever 30 is detected by using the tilt detecting switches 60R and 60L of Embodiment 2. In the present embodiment, the same reference signs are used for the same components as in Embodiment 2, and a repetition of the same explanation is avoided.

As shown in FIG. 6, in the present embodiment, the tilt detection engaging portions 26R and 26L are provided at the side surface 24 of the cam 20 and include the respective concave portions 27R and 27L each spreading in a predetermined angular range. Specifically, each of the concave portions 27R and 27L is a flat surface that is parallel to the side surface 24 and is located at a middle side of the cam 20 in the front-rear direction (i.e., in a direction in which the support shaft 21 extends) from the side surface 24. The inclined portion 28R is formed at one side of the concave portion 27R which side is close to the center of the cam 20

(i.e., a middle side in a circumferential direction). The inclined portion 28R connects the concave portion 27R and the side surface 24 and extends from the center axis of the support shaft 21 in the radial direction of the cam 20. The inclined portion 28L is formed at one side of the concave portion 27L which side is close to the center of the cam 20 (i.e., an outer side in the circumferential direction). The inclined portion 28L connects the concave portion 27L and the side surface 24 and extends from the center axis of the support shaft 21 in the radial direction of the cam 20. Each of the inclined portions 28R and 28L is provided at a position at which the tilt of the operating lever 30 is detected. Further, a maximum tilt engaging portion 29R is located at one side of the concave portion 27R which side is an outer side of the cam 20 (i.e., an outer side in the circumferential direction), and a maximum tilt engaging portion 29L is located at one side of the concave portion 27L which side is an outer side of the cam 20 (i.e., an outer side in the circumferential direction). Each of the maximum tilt engaging portions 29R and 29L is provided at a position at which the maximum tilt position of the operating lever 30 is detected. The maximum tilt engaging portion 29R is an inclined portion that connects the concave portion 27R and the side surface 24 and extends from the center axis of the support shaft 21 in the radial direction of the cam 20. The maximum tilt engaging portion 29L is an inclined portion that connects the concave portion 27L and the side surface 24 and extends from the center axis of the support shaft 21 in the radial direction of the cam 20. To be specific, in the present embodiment, each of the concave portions 27R and 27L is sandwiched by the side surface 24 of the cam 20 from both sides in the circumferential direction (swing direction) of the cam 20, the side surface 24 being a portion that pushes the acting portions 61R and 61L. Since the other components are the same as those of Embodiment 2, explanations thereof are omitted.

The electric lever device 4 of the present embodiment can detect the tilt of the operating lever 30 and the maximum tilt position of the operating lever 30 as below.

Explanations of Operations in Embodiment 4

Figure 7A:
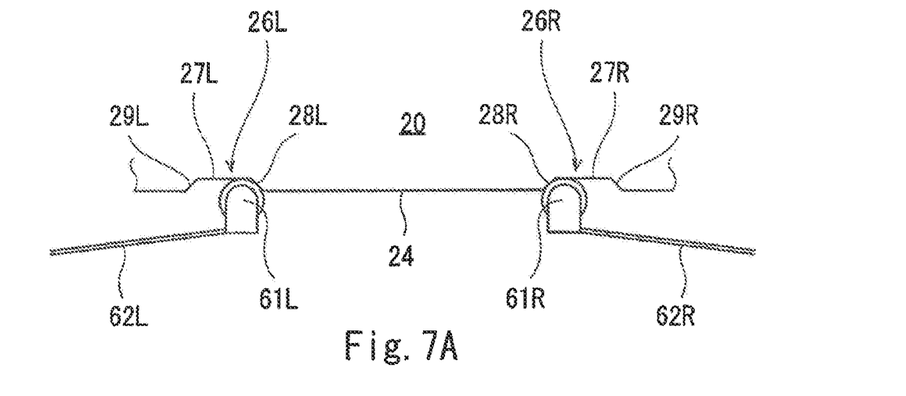
FIG. 7A is a plan view when the operating lever is neutral.
Figure 7B:
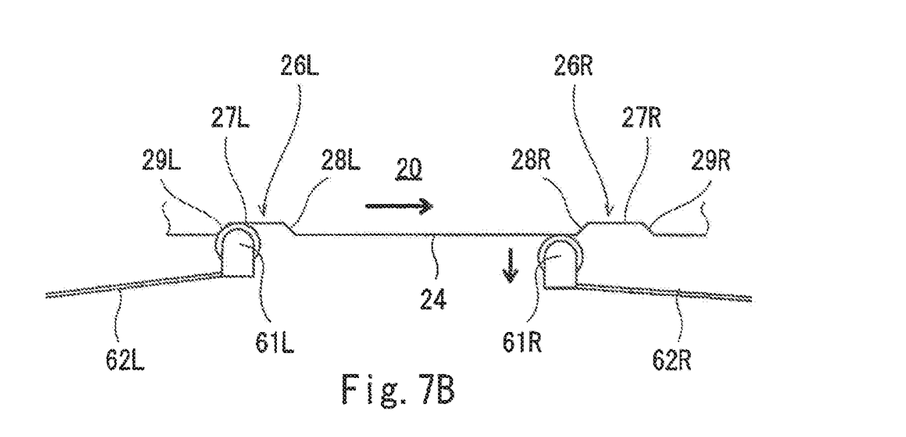
FIG. 7B is a plan view when the operating lever is tilted.
Figure 7C:
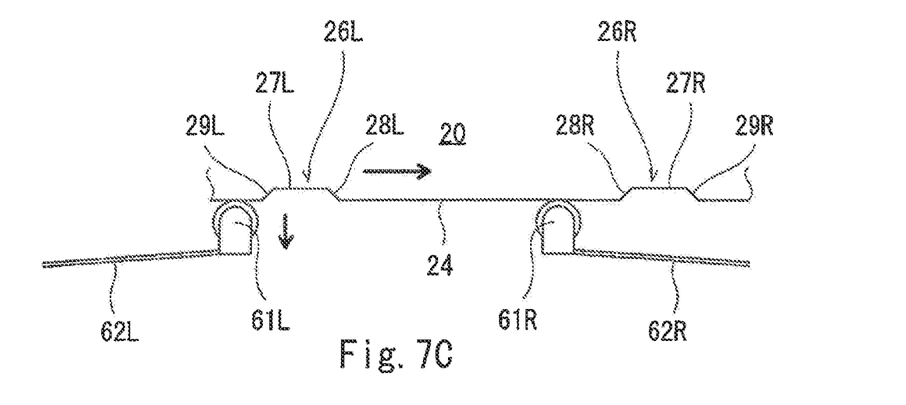
FIG. 7C is a plan view when a maximum tilt position of the operating lever is detected.

FIGS. 7A to 7C are diagrams showing operating parts of the tilt detecting switches 60R and 60L of the electric lever device 4 shown in FIG. 6. FIG. 7A is a plan view when the operating lever 30 is neutral. FIG. 7B is a plan view when the operating lever 30 is tilted. FIG. 7C is a plan view when the maximum tilt position of the operating lever 30 is detected. It should be noted that since the switch main body portions 63R and 63L of the tilt detecting switches 60R and 60L are the same as those shown in FIG. 3, they are not shown in FIGS. 7A to 7C.

As shown in FIG. 7A, when the operating lever 30 is located at the neutral position, the acting portion 61R of the first tilt detecting switch 60R is located at the concave portion 27R of the tilt detection engaging portion 26R, and the acting portion 61L of the second tilt detecting switch 60L is located at the concave portion 27L of the tilt detection engaging portion 26L. Therefore, the tilt of the operating lever 30 is not detected.

As shown in FIG. 7B, for example, when the operating lever 30 is tilted in the right direction, and the cam 20 integrally swings, the first acting portion 61R of the first tilt detecting switch 60R moves from the first concave portion 27R through the first inclined portion 28R onto the side surface 24 of the cam 20 to be pushed toward the first switch main body portion 63R. With this, the tilt of the operating lever 30 in the right direction is detected. In this state, the second acting portion 61L of the second tilt detecting switch 60L is located at the concave portion 27L of the tilt detection engaging portion 26L.

As shown in FIG. 7C, when the operating lever 30 is further tilted in the right direction from the above state, the second acting portion 61L of the second tilt detecting switch 60L moves onto the side surface 24 of the cam 20 by the second maximum tilt engaging portion 29L of the second tilt detection engaging portion 26L to be pushed toward the second switch main body portion 63L. With this, the tilt of the operating lever 30 in the right direction to the maximum tilt position (full stroke) is detected.

When the operating lever 30 is tilted in the left direction, the second acting portion 61L of the second tilt detecting switch 60L moves from the second concave portion 27L through the second inclined portion 28L onto the side surface 24 of the cam 20 to be pushed toward the second switch main body portion 63L. With this, the tilt of the operating lever 30 in the left direction is detected. When the operating lever 30 is further tilted in the left direction, the first acting portion 61R of the first tilt detecting switch 60R moves onto the side surface 24 of the cam 20 by the first maximum tilt engaging portion 29R of the first tilt detection engaging portion 26R to be pushed toward the first switch main body portion 63R. With this, the tilt of the operating lever 30 in the left direction to the maximum tilt position (full stroke) is detected.

As above, according to the electric lever device 4 of Embodiment 4, the neutral position and maximum tilt position of the operating lever 30 can be detected by the tilt detection engaging portions 26R and 26L and maximum tilt engaging portions 29R and 29L which are provided at the cam 20 and the tilt detecting switches 60R and 60L which are provided at the casing 10.

Other Embodiment

The above embodiments have explained the electric lever devices 1 to 4 in each of which the operating lever 30 can tilt in the first and second directions (both right and left directions) from the neutral position. However, the electric lever device may be configured such that the operating lever 30 can tilt only in the first direction from the neutral position. In this case, any of the configurations of Embodiments 1 to 4 can be utilized.

Conclusion

As above, according to the electric lever devices 1 to 4, since the tilt detecting switch 60 is arranged at a position higher than the base portion 11 of the casing 10, the attachment, positional adjustment, and the like of the tilt detecting switch 60 can be easily performed. In addition, the adjustment, maintenance, and the like of the tilt detecting switch 60 after the attachment can be easily performed.

Further, since the tilt detecting switch 60 is directly operated by the movement of the cam 20 that moves integrally with the operating lever 30, the tilt can be appropriately detected.

Furthermore, since the tilt detecting switch 60 is arranged in the vicinity of the potentiometer 25, the electric lever device 1 can be made compact. In addition, the configuration regarding the push rods 50 that return the operating lever 30 to the neutral position through the cam 20 can be made compact. Therefore, the electric lever device 1 can be made compact, and the cost can be reduced.

Each of the above embodiments has explained an example in which the operating lever 30 is tilted in the left and right directions. However, the present invention is applicable to an electric lever device including the operating lever 30 which is tilted in only one of the left direction and the right direction from the neutral position. Further, the direction in which the operating lever 30 is tilted may be a front-rear direction or an oblique direction and is not limited to the above embodiments.

The foregoing has explained the embodiment in which one tilt detecting switch 60 is provided and the embodiment in which two tilt detecting switches 60R and 60L are provided. However, the number of tilt detecting switches 60 is not limited. The above configuration of the tilt detecting switch 60 is one example, and the tilt detecting switch 60 is only required to be a switch that can be turned on and off by the tilt detection engaging portion 26 provided at the cam 20. Therefore, the number of tilt detecting switches 60, the configuration of the tilt detecting switch 60, and the like are not limited to those in the above embodiments.

Each of the above embodiments is one example. As long as the tilt detecting switch 60 is provided at the upper portion of the casing 10, and the acting portion 61 of the tilt detecting switch 60 is attached so as to be operated by the tilt detection engaging portion 26 of the cam 20, the configurations of the present invention may be modified within the scope of the present invention. The present invention is not limited to the above embodiments.

REFERENCE SIGNS LIST

1 to 4 electric lever device
10 casing
11 base portion
12 guide hole
13 support bracket
17 switch bracket
17R, 18R first switch bracket
17L, 18L second switch bracket
20 cam
21 support shaft
22 outer peripheral surface
24 side surface
25 potentiometer
26 tilt detection engaging portion
26R first tilt detection engaging portion
26L second tilt detection engaging portion
27 concave portion
27R first concave portion
27L second concave portion
28 inclined portion
28R inclined portion
28L inclined portion
29R maximum tilt engaging portion
29L maximum tilt engaging portion
30 operating lever
50 push rod
53 spring
54 spring casing
60 tilt detecting switch
60R first tilt detecting switch
60L second tilt detecting switch
61 acting portion
61R first acting portion
61L second acting portion
62 arm portion
62R first arm portion
62L second arm portion
63 switch main body portion
63R first switch main body portion
63L second switch main body portion

The invention claimed is:

1. An electric lever device comprising:
a casing including a base portion attached to a machine main body;
a cam supported by a support shaft at the casing and configured to swing in a plane intersecting with a center axis of the support shaft, the cam including an outer peripheral surface extending in a swing direction of the cam and facing upward; and
an operating lever fixed to the outer peripheral surface of the cam and configured to be tilted integrally with the cam in the same plane, the operating lever extending from the outer peripheral surface in a vertically upper direction when the operating lever is located at a neutral position, wherein:
a tilt detecting switch configured to detect tilt of the operating lever is attached to the casing so as to be located higher than the base portion, and an acting portion of the tilt detecting switch is located higher than the support shaft; and
the cam includes a tilt detection engaging portion configured to move the acting portion of the tilt detecting switch when the operating lever is tilted from the neutral position.

2. The electric lever device according to claim 1, wherein:
the cam includes the outer peripheral surface and a side surface;
the tilt detection engaging portion is formed at the side surface;
the casing includes a bracket at a position away from the cam in an axial direction of the support shaft; and
the tilt detecting switch is attached to the bracket.

3. The electric lever device according to claim 1, wherein:
the cam includes the outer peripheral surface and a side surface;
the tilt detection engaging portion is formed at the outer peripheral surface;
the casing includes a bracket at a position away from the cam in the swing direction of the cam; and
the tilt detecting switch is attached to the bracket.

4. The electric lever device according to claim 1, wherein:
the cam includes:
a first tilt detection engaging portion configured to detect that the operating lever is tilted in a first direction from the neutral position and
a second tilt detection engaging portion configured to detect that the operating lever is tilted in a second direction from the neutral position; and
the tilt detecting switch includes:
a first tilt detecting switch including a first acting portion that is moved by the first tilt detection engaging portion when the operating lever is tilted in the first direction from the neutral position and
a second tilt detecting switch including a second acting portion that is moved by the second tilt detection engaging portion when the operating lever is tilted in the second direction from the neutral position.

5. The electric lever device according to claim 1, wherein:
the cam includes the tilt detection engaging portion at one position of the cam; and
the tilt detecting switch is configured such that even when the operating lever is tilted in any of a first direction and a second direction from the neutral position, the tilt detection engaging portion moves the acting portion.

6. The electric lever device according to claim 1, wherein the cam further includes a maximum tilt engaging portion configured to move the acting portion of the tilt detecting switch when the operating lever is tilted to a maximum tilt position.

7. An electric lever device comprising:
a casing including a base portion attached to a machine main body;
a cam supported by a support shaft at the casing and configured to swing in a plane intersecting with a center axis of the support shaft; and
an operating lever fixed to the cam and configured to be tilted integrally with the cam in the same plane, wherein:
a tilt detecting switch configured to detect tilt of the operating lever is attached to the casing so as to be located higher than the base portion;
the cam includes a tilt detection engaging portion configured to move an acting portion of the tilt detecting switch when the operating lever is tilted from a neutral position;
the cam includes an outer peripheral surface and a side surface; and
the tilt detection engaging portion is formed at the side surface.

8. The electric lever device according to claim 7, wherein:
the casing includes a bracket at a position away from the cam in an axial direction of the support shaft; and
the tilt detecting switch is attached to the bracket.

9. The electric lever device according to claim 7, wherein:
the cam includes:
a first tilt detection engaging portion configured to detect that the operating lever is tilted in a first direction from the neutral position, and
a second tilt detection engaging portion configured to detect that the operating lever is tilted in a second direction from the neutral position; and
the tilt detecting switch includes:
a first tilt detecting switch including a first acting portion that is moved by the first tilt detection engaging portion when the operating lever is tilted in the first direction from the neutral position and
a second tilt detecting switch including a second acting portion that is moved by the second tilt detection engaging portion when the operating lever is tilted in the second direction from the neutral position.

10. The electric lever device according to claim 7, wherein:
the cam includes the tilt detection engaging portion at one position of the cam; and
the tilt detecting switch is configured such that even when the operating lever is tilted in any of a first direction and a second direction from the neutral position, the tilt detection engaging portion moves the acting portion.

11. The electric lever device according to claim 7, wherein the cam further includes a maximum tilt engaging portion configured to move the acting portion of the tilt detecting switch when the operating lever is tilted to a maximum tilt position.

* * * * *